UNITED STATES PATENT OFFICE.

CAMILLO PERRON, OF ROME, ITALY.

TREATMENT OF NICKEL AND COPPER-NICKEL ORES.

SPECIFICATION forming part of Letters Patent No. 709,277, dated September 16, 1902.

Application filed June 25, 1902. Serial No. 113,076. (No specimens.)

*To all whom it may concern:*

Be it known that I, CAMILLO PERRON, mining and metallurgical engineer, a subject of the King of Italy, and a resident of Rome, Italy, have invented certain new and useful Improvements in or Relating to the Treatment of Nickel and Copper-Nickel Ores, (for which I applied for Letters Patent of the Empire of Germany on November 28, 1901,) of which the following is a specification.

In some places, particularly in the Italian Alps, there are large quantities of serpentine containing nickel and sometimes also copper. Since, however, the nickel contents are in many cases very slight and only amount to about one to six per cent., the hitherto-known and time-consuming methods cannot very well be used for the recovery of the nickel, so that it is better to lose some of the metal—viz., not to attempt to extract the whole of the metal from the ore.

As is well known, sulfid of ammonium dissolves sulfids of the metals of the alkalies, such as sulfid of nickel, to some extent, if freshly precipitated. I have discovered that these compounds have the same effect upon nickel-containing ores. Of course the use of such is only practical for the treatment of ore which is poor in nickel.

The finely-ground raw nickel ore is treated with an excess solution of sulfids—for instance, sulfid of ammonium—in vats of material which is resistant to sulfid of ammonium, and the mass is stirred or kept in motion otherwise. The use of heat is not necessary. The lixiviation takes place rapidly, one to two hours being generally sufficient; but the necessary duration of treatment can be determined by preliminary experiments on a small scale. After the lixiviation the liquid is collected and the residue is washed out with cold water. Before the further treatment for the extraction of the nickel the liquid can in its present state be used for the lixiviation of further quantities of ore. The sulfid of nickel dissolved in the sulfid of ammonium is then recovered by the methods known in chemistry for the recovery of the salts of ammonium, ammonia, &c.—as, for instance, by passing hydrogen sulfid in the form of gas or by adding it in aqueous solution.

As is well known, there are various sulfids of ammonium, ranging from the colorless or neutral to the yellow sulfids containing ammonium sulfids and secondary hyposulfites and the like. All these sulfids, and particularly the colorless, can be used for the present purpose. In order to obtain an effective action, it is advisable for the sulfid of ammonium to contain free ammonia and no excess of hydrosulfuric acid or sal-ammoniac.

As stated, the extraction of the nickel is not complete, as is also the case in the ordinary methods; but the new method is practical because it can be easily and cheaply used for the treatment of poor ore. Any traces of copper left in the nickel are immaterial.

Having now fully described my said invention and the manner in which the same is to be performed, I declare that what I claim as my invention is—

1. A process of lixiviation of poor copper-nickel ores, which consists in the treatment of the said ores in crude or natural condition with sulfid of ammonium.

2. A process of lixiviation of copper-nickel ores which consists in the treatment of the said ores with sulfid of ammonium containing free ammonia.

3. A process of lixiviation of copper-nickel ores which consists in the treatment of the said ores with sulfids of the metals of the alkalies.

4. A process of lixiviation of copper-nickel ores which consists in the treatment of the said ores with sulfids of the metals of the alkalies containing free ammonia.

5. A process of extracting nickel from its ores which consists in treating nickel ore with a solution of the sulfids of the metals of the alkalies, stirring the same, collecting the liquid, washing the residue with cold water, and reducing the metallic nickel by means of hydrogen sulfid.

In witness whereof I have hereunto set my signature in the presence of two witnesses.

CAMILLO PERRON.

Witnesses:
 G. B. BARNARD,
 Z. FEDERICO GENTIL.